(12) United States Patent
Narayan

(10) Patent No.: US 6,780,395 B2
(45) Date of Patent: Aug. 24, 2004

(54) SYNTHESIS GAS PRODUCTION

(75) Inventor: Raghu S. Narayan, Conroe, TX (US)

(73) Assignee: Equistar Chemicals, LP, Houston, TX (US)

( * ) Notice: Subject to any disclaimer, the term of this patent is extended or adjusted under 35 U.S.C. 154(b) by 191 days.

(21) Appl. No.: 10/158,756

(22) Filed: May 30, 2002

(65) Prior Publication Data

US 2003/0223931 A1 Dec. 4, 2003

(51) Int. Cl.⁷ ................................................ C01B 3/26
(52) U.S. Cl. ..................................... 423/650; 252/373
(58) Field of Search ........................ 252/373; 423/650

(56) References Cited

U.S. PATENT DOCUMENTS 5,030,661 A * 7/1991 Lywood ...................... 518/704
6,495,610 B1 * 12/2002 Brown ......................... 518/706

FOREIGN PATENT DOCUMENTS

WO      WO 00/09441     * 2/2000            C01B/3/00

OTHER PUBLICATIONS

R.W. Baker et al., Membrane Separation Systems, Recent Developments and Future Directions, Noyes Data Corporation, 199 Chapter 3, "Gas Separation," pp. 189–241.*

Richard Baker, *Membrane Technology and Applications*, McGraw Hill Professional Publishing, 1999, Chapter One. "Overview of Membrane Science and Technology," pp. 1–13.

S. P. Nunes and K. V. Peinemann, *Membrane Technology in the Chemical Industry*, VCH Verlagsgesellschaft Mbh, 2001, Chapter 6, "Gas Separation with Membranes," pp. 39–67.

S. P. Nunes and K.V. Peinemann, *Membrane Technology*, American Chemical Society, 1999, Chapter 3, "Membrane Preparation," pp. 6–11.

Douglas M. Ruthven, S. Farooq. and K.S. Knaebel, *Pressure Swing Adsorption*, John Wiley and Sons Ltd., 1993, "Pressure Swing".

* cited by examiner

*Primary Examiner*—Stanley S. Silverman
*Assistant Examiner*—Maribel Medina
(74) *Attorney, Agent, or Firm*—Roderick W. MacDonald

(57) ABSTRACT

A method for forming a synthesis gas with a tailored hydrogen/carbon monoxide ratio that is optimized for use in a downstream process wherein membrane gas separation is employed to form a hydrogen rich stream and a separate synthesis gas product which has a tailored hydrogen/carbon monoxide ratio.

7 Claims, No Drawings

SYNTHESIS GAS PRODUCTION

BACKGROUND OF THE INVENTION

1. Field of the Invention

This invention relates to a method for forming a tailored synthesis gas that has a controlled hydrogen/carbon monoxide (H2/CO) ratio. More particularly this invention, by way of gas separation by a membrane, forms a synthesis gas whose H2/CO ratio is deliberately controlled to meet the H2/CO ratio best suited or otherwise desired in a feed stock for one or more specific, predetermined downstream processes. For example, by this invention a synthesis gas can be formed which consistently has its H2/CO ratio controlled to be about 1.6/1 which is ideal for a synthesis gas feed stock to a Fischer Tropsch process.

2. Description of the Prior Art

Heretofore steam reforming of a hydrocarbon feed containing methane, e.g., natural gas, has been performed in order to produce a synthesis gas rich in hydrogen by converting the carbon in the methane to carbon monoxide and freeing hydrogen from the steam.

Depending upon the composition of the hydrocarbon feed, the reforming conditions, the catalyst used, and many other variables, the synthesis gas product from such steam/methane reforming can vary widely as to its composition in general, and its H2/CO ratio in particular.

The synthesis gas product aforesaid is then used in one or more different downstream processes to make one or more chemical products of commercial value. For example, a conventional synthesis gas product can be used as a source of hydrogen for hydrotreating other hydrocarbon streams in a crude oil refinery, or, after suitable compression, can be used as a feed stock for making ammonia or methanol.

However, downstream processes which use synthesis gas as a feed operate more efficiently when the H2/CO ratio in their feed is more carefully controlled than can currently be done in a conventional steam/methane reforming system.

Accordingly, it is desirable to be able to control the H2/CO ratio of a steam/methane reformer product so as to tailor the synthesis gas product from that reformer to better meet or otherwise suit the requirements of the specific downstream processing unit or units for which that particular synthesis gas product will be used as a feed material.

SUMMARY OF THE INVENTION

In accordance with this invention, there is provided a method for producing a tailored synthesis gas that has a controlled H2/CO ratio, which ratio is tailored to meet the desired or optimum operating requirements of at least one specific, predetermined downstream process that uses synthesis gas as a feed stock.

Synthesis gas generators (reformers) are well known in the art, having been used in various forms in industry since the classical Haber Bosch Process was developed in 1917. All these processes operate on the basic reforming reaction which reacts carbon in some form, e.g., coke, natural gas, naphtha, and the like with steam, usually, but not always, in the presence of a catalyst, to produce hydrogen and carbon monoxide. The H2/CO ratio of the synthesis gas varies widely depending on the form of the carbon source feed, but if one mol of methane was reformed with steam it would produce a synthesis gas rich in hydrogen, viz., 3 mols of hydrogen and 1 mol of carbon monoxide or a H2/CO ratio of 3/1. A competing reaction known as the water gas shift reaction also takes place in a reformer to some extent wherein carbon monoxide reacts with steam to form carbon dioxide and additional hydrogen. The shift reaction is a secondary reaction in a reformer because the high temperature and lower pressure of the conventional reformer favor the strongly endothermic reforming reaction, whereas the exothermic shift reaction is favored by low temperatures and is largely unaffected by pressure change. Normal operating conditions for a steam/methane reformer are from about 750 to about 900° C. at from about 100 to about 500 psig over a catalyst such as nickel, cobalt, and the like.

This invention is useful with any device that performs a reforming reaction on a methane containing feed to produce a synthesis gas that contains at least in part a mixture of hydrogen and carbon monoxide, preferably a substantial amount of said mixture, still more preferably a major amount on a volume basis of said mixture.

The aforesaid synthesis gas will vary in its composition depending upon the feed stock to the reformer, e.g., ethane propane, natural gas or the like, and mixtures of two or more thereof. Natural gas can vary in its composition depending upon where geologically and geographically it was produced but it generally contains a preponderance of methane with minor amounts of hydrocarbons having from two to five carbon atoms per molecule and one or more of carbon dioxide, nitrogen, sulfur, and the like. A synthesis gas from a natural gas feed can, for example, contain about 70 volume percent (hereinafter "vol %") hydrogen, about 17 vol % carbon monoxide, about 8 vol % carbon dioxide with the remainder essentially methane plus trace amounts of inerts such as nitrogen, all vol % being based on the total volume of the synthesis gas. Hereafter all percentage figures will be volume percent figures, and all volume percent figures herein are on a dry basis. Considering the conventional range of commercial reformer feed stocks synthesis gas compositions can generally be from about 65 to about 75 vol % hydrogen, from about 13 to about 20 vol % carbon monoxide, and from about 6 to about 10 vol % carbon dioxide with the remainder various combinations of one or more of methane, nitrogen, and the like. The H2/CO ratios will also vary with the reformer feed stock composition. For example, for a natural gas feed the H2/CO ratio can be about 4/1, with propane 3.5/1, and with naphtha 3/1. Generally, the synthesis gas reformer product useful in this invention will have an H2/CO ratio of from about 3/1 to about 4/1, depending on the reformer feed composition.

The synthesis gas issuing from the reformer is, as stated above, at a relatively low pressure of from about 100 to about 500 psig. Normally the synthesis gas is next compressed in a conventional manner to a pressure of at least about 600 psig, preferably from about 600 to about 2000 psig, at essentially ambient temperature, e.g., from about 80 to about 120° F. The precise degree of compression depends upon the desired downstream use of the synthesis gas. For example, if the gas is going to an ammonia synthesis plant it will be compressed to about 1500 psig, whereas for a methanol plant it will be compressed to about 2000 psig.

All or any part of the compressed synthesis gas is then, in accordance with this invention, passed to a membrane separation unit. To the extent part of the compressed synthesis gas is not subjected to such membrane separation unit, it can be passed to one or more conventional manufacturing plants for the production of one or more of ammonia, methanol, and the like.

The compressed synthesis gas feed for the membrane separation unit will be at essentially the same temperature and pressure conditions stated above for the compression step, e.g., at least about 600 psig and essentially ambient temperature.

Chemical separation with a membrane had its start in the early nineteenth century with the diffusion work of Thomas Graham, the father of Graham's law—the rate of diffusion of a gas is inversely proportional to the square root of its molecular weight. Considerable advancements have been made since the time of Graham in materials and processes for making and using membranes as well as in the mechanistic understanding of membrane transport phenomena. For example, the development of the asymmetric membrane morphology by Loeb and Sourirajan was a major breakthrough. Asymmetric membranes are essentially anisotropic (having a graded distribution of pore sizes) membranes with a well-defined skin on one side of the membrane. Immediately below this skin, the pore size is very small (less than one nanometer). The pore size increases as it moves away from the skin. There may or may not be a skin on the opposite face of the membrane. Membrane separation can be carried out in numerous forms and patterns well known in the art and applicable to this invention. For example, any standard flow pattern, co-current, counter-current, cross flow, or dead-end flow can be employed. For more detailed information concerning the design, application, and operation of membranes for chemical component separation see Membrane Technology and Applications, Richard Baker, McGraw Hill Professional Publishing, 1999, or Membrane Technology in the Chemical Industry, S. P. Nunes and K. V. Peinemann, VcH Verlagsgesellschaft Mbh, 2001.

This invention deals essentially with the separation of hydrogen from carbon monoxide and other gaseous chemicals in the aforesaid compressed synthesis gas product. Accordingly, this invention employs the gas separation branch of the family of membrane separation processes. More particularly, this invention uses asymmetric, skin-type membranes that employ a solution diffusion mechanism and hydrostatic pressure differentials of from about 0.1 to about 1 megapascal (MPa).

A distinct advantage of this invention is in the employment of membrane gas separation technology. The hydrogen/carbon monoxide ratio of a membrane gas separation product can be more precisely controlled, and, therefore, tailored to meet the requirement of a downstream process for optimum operation of that downstream process. This is not so with other hydrogen separation processes.

This invention employs conventional gas separation membranes by removing a hydrogen rich stream from the compressed synthesis gas product leaving a hydrogen depleted synthesis gas stream containing most all of the carbon monoxide, carbon dioxide, if any, methane, nitrogen and other components originally in said stream. The kinetic diameter, in Angstroms, of hydrogen is 2.89, whereas that of other components of the synthesis gas feed to the membrane separation process of this invention are larger. For example, the kinetic diameters, in Angstroms of representative components are: carbon dioxide-3.3, nitrogen-3.64, carbon monoxide-3.76, and methane-3.8.

Pursuant to this invention a membrane is chosen which is permeable to hydrogen and much less permeable to the other components of the synthesis gas, which components have kinetic diameters larger than that of hydrogen.

The partial pressure differential of the individual chemical components in the synthesis gas that is fed into the membrane separation unit is the driving force for the separation function. This hydrostatic pressure difference leads to volume flux and to a separation of different chemical components when they permeate to greater (hydrogen) and lesser (carbon monoxide, etc.) extents and at different rates across the membrane member. This transmember pressure drop is important to the desired separation result of this invention, and is preferably from about 500 psi to about 1500 psi. A higher pressure drop is better since the higher the transmember differential pressure, the more efficient the separation. However, this consideration is limited by the mechanical design, e.g., thickness, and physical strength of the membrane member and the material(s) of which it is constructed.

Organic polymers are the dominating materials for asymmetric, skin-type membranes as described hereinabove, and which are useful in this invention. Such polymers are well known and commercially available. They include polysulfone, polyethersulfone, polyimide, polyetherimide, polycarbonate (nonbrominated), and polyphenyleneoxide. This group of polymers substantially favors the separation of hydrogen, particularly from carbon monoxide, methane, carbon dioxide, nitrogen and the like. For example, the following commercially available polymers show substantially favorable permeability for hydrogen over the other representative components of a conventional synthesis gas.

|  | Permeability at 30° C. (Barrer*) | | | |
| --- | --- | --- | --- | --- |
| Polymer | Hydrogen | Nitrogen | Methane | Carbon Dioxide |
| Polymide (Matrimid) | 28.1 | 0.32 | 0.25 | 10.7 |
| Polyphenyleneoxide | 113.0 | 3.81 | 11.00 | 75.8 |
| Polysulfone | 14.0 | 0.25 | 0.25 | 5.6 |

*The permeability coefficient is commonly given in Barrer, named after R. M. Barrer. One Barrer equals $10^{-10}$ cm$^3$ cm/cm$^2$s cm Hg.

Carbon monoxide having a kinetic diameter about the same as methane would demonstrate a permeability in the above polymers approaching that of methane. Accordingly, the foregoing polymers strongly favor the separation of hydrogen from synthesis gas in general, and carbon monoxide in particular. Polysulfone and polyimides are the most preferred for this type of gas separation. For more details concerning these polymers and their fabrication and use as gas separation membranes, see the references cited hereinabove, and, in addition, see Membrane Technology, S. P. Nunes and K. V. Peinemann, American Chemical Society, 1999.

In operation, the compressed synthesis gas is passed through a membrane separation unit containing a membrane formed from one or more of the foregoing polymers at a temperature of from about ambient to about 190° F., preferably from about 80° F. to about 190° F. The pressure is in the range of pressures for the compressed synthesis gas aforesaid and sufficient to establish a transmembrane differential pressure drop in the range aforesaid, such conditions being controlled so as to keep the synthesis gas components in the gaseous state.

A hydrogen rich permeate stream is removed from the separation unit on one side of the membrane while a hydrogen depleted synthesis gas retentate stream is removed on the opposite side.

The hydrogen rich permeate has a temperature of from about ambient to about 190° F., preferably from about 80 to about 190° F. and a pressure of at least about 50 psig but substantially below the 600 to 2000 psig pressure of the compressed synthesis gas feed to the membrane. Preferably, the permeate is from about 50 to about 500 psig, and has a composition of from about 85 to about 95 vol % hydrogen, from about 5 to about 10 vol % carbon monoxide, from about 2 to about 5 vol % carbon dioxide, and trace amounts of methane and inerts such as nitrogen, all vol % being based on the total volume of the permeate.

The hydrogen rich permeate is suitable for any use as a hydrogen source. For example, it could be used in most any hydrotreating process. It is a particularly ideal feed for a pressure swing adsorption process, especially if it is at the higher end of the aforesaid pressure range. Pressure swing adsorption units are for generating a very pure hydrogen product stream, and their operation is well known in the art, see Pressure Swing Adsorption, Douglas M. Ruthven, S. Farooq, and K. S. Knaebel, published by John Wiley and Sons Ltd., 1993. Generally, pressure swing operating conditions will be in the same temperature and pressure ranges as aforesaid for the gas separation membrane unit, there being only a slight temperature loss and only about a 5 to 10 psig loss in the adsorption process. The hydrogen rich product stream from the adsorption process can be at least 99% pure hydrogen and 99.999% purity is readily achievable. This hydrogen rich stream can be used as a prime hydrogen source most anywhere desired, including, but not limited to most any hydrotreating process. The tail gas from the adsorption process is a useful fuel. For example, it could be used as a fuel source for heating the steam/methane reformer that generated the initial synthesis gas aforesaid.

The hydrogen depleted synthesis gas retentate stream leaving the membrane separation unit has a temperature and pressure essentially in the same ranges as the compressed synthesis gas feed stock described hereinabove. The temperature of the retentate is about the same as the feed stock and, in spite of the hydrogen separation in the membrane unit, the pressure of the retentate is just a little lower than that of the feed stock. Thus, the retentate is suitable for prompt use in a downstream process.

The composition of the retentate can be from about 40 to about 55 vol %, from about 35 to about 45 vol % carbon monoxide, from about 8 to about 12 vol % carbon dioxide, and the remainder is essentially methane and inerts such as nitrogen, all vol % being based on the total volume of the retentate.

The H2/CO ratio of the retentate will vary depending upon how the membrane separation unit is operated, viz., at a greater or lesser hydrogen removal rate by way of the permeate withdrawal stream. Generally the H2/CO ratio will be in a broad range that is substantially less than the about 3/1 to 4/1 range of the synthesis gas after compression and as it is fed into the membrane gas separation process. Preferably, the H2/CO ratio of the retentate will be from about 0.7/1 to about 1.6/1.

The H2/CO ratio of the retentate will, according to this invention, be tailored by way of operation of the membrane gas separation process to be a desired, e.g., optimum H2/CO ratio, for one or more operations downstream of said membrane separation unit that have been predetermined to be recipients of the retentate as a feed stock. For example, for a downstream Fischer Tropsch process for a natural gas to liquids operation, the membrane unit can be operated to yield a retentate having a H2/CO ratio of about 1.6/1, an ideal ratio for that particular downstream operation. However, the H2/CO ratio need not be that finely tailored even though it is possible to do so when employing membrane gas separation technology, an advantage of this invention over the use of other hydrogen separation processes that could be employed on the compressed synthesis gas aforesaid. Generally, for a Fischer Tropsch process, the H2/CO ratio can be from about 0.7/1 to about 1.6/1. For an oxoalcohol downstream process, the membrane unit could be operated to yield a retentate with a H2/CO ratio of from about 1/1 to about 1.1/1, a fine tuned tailoring of the H2/CO ratio achievable by this invention. The H2/CO ratio can also be tailored by this invention. For example, for combined methanol and dimethylether downstream manufacturing plants, the H2/CO ratio of the retentate could be controlled by the membrane separation process to be from about 1.3/1 to about 1.6/1. Other examples will be readily apparent to one skilled in the art once apprised of this invention's advantageous use of the precise tailoring capabilities of membrane gas separation technology.

EXAMPLE

A synthesis gas product is formed from a commercial West Texas natural gas stream using a conventional steam/methane reformer operating at about 800° C. and 250 psig with a commercially available nickel catalyst. The synthesis gas has a composition of about 70 vol % hydrogen, about 17 vol % carbon monoxide, and about 8 vol % carbon dioxide, with the remaining 5 vol % being essentially methane and nitrogen, all vol % being based on the total volume of the gas. The H2/CO ratio is about 4/1.

The synthesis gas is compressed to about 1500 psig at 90° F., and then passed to a cross flow membrane gas separation unit that employs a commercially available membrane composed essentially of polyimide (matrimid) in the asymmetric skin-type configuration.

The membrane gas separation unit is operated in a conventional manner to yield a hydrogen rich permeate stream that is about 90 vol % hydrogen, the remainder being essentially carbon monoxide and/or dioxide, methane, and nitrogen. The permeate is passed to a conventional pressure swing adsorption unit to produce a hydrogen stream product that contains at least 99.99% pure hydrogen.

The retentate of the membrane unit contains about 45 vol % hydrogen, 40 vol % carbon monoxide, 10 vol % carbon dioxide, with the remainder essentially methane and nitrogen, all vol % being based on the total volume of the retentate, and having a H2/CO ratio of about 1.6/1. The retentate is then used as feed material for downstream Fischer Tropsch, dimethylether, and/or methanol producing units.

What is claimed is:

1. A method for producing a synthesis gas with a controlled hydrogen/carbon monoxide ratio, which ratio is tailored to meet the desired operating requirements of an oxoalcohol process, comprising reforming a feed containing methane to form a first mixture of hydrogen and carbon monoxide, compressing said first mixture to a pressure of from about 600 to about 2,000 psig at a temperature of from about 80 to about 120° F., subjecting all of said compressed first mixture to a membrane gas separation process consisting of an asymmetric, skin type, solution diffusion process that employs a hydrostatic pressure differential across the membrane of from about 0.1 to about 1 MPa, that favors the separation of hydrogen from a mixture of hydrogen, carbon monoxide, carbon dioxide, methane, and inerts, and that has a transmember pressure drop of from about 500 psi to about 1,500 psi, wherein a portion of said hydrogen in said first mixture is separated from said first mixture to produce a separate second mixture containing hydrogen and carbon monoxide and having a hydrogen/carbon monoxide ratio of from 1/1 to 1.1/1, said second mixture having said tailored hydrogen/carbon monoxide ratio for the operation of said oxoalcohol process.

2. The method of claim 1 wherein said feed is natural gas.

3. The method of claim 2 wherein said feed contains at least about 50 volume percent methane.

4. The method of claim 1 wherein said first mixture contains at least about 50 volume percent of a mixture of hydrogen and carbon monoxide.

5. The method of claim 4 wherein said first mixture is comprised of at least about 50 volume percent of hydrogen.

6. The method of claim 1 wherein said first mixture has a hydrogen/carbon monoxide ratio of from about 3/1 to about 4/1.

7. The method of claim 1 where said membrane is composed of at least one polymer selected from the group consisting essentially of polysulfone, polyethersulfone, polyimide, polyetherimide, polycarbonate, and polyphenyleneoxide.

* * * * *